United States Patent
Munakata et al.

(10) Patent No.: US 7,368,095 B2
(45) Date of Patent: May 6, 2008

(54) COMPOSITE OXIDE FOR SOLID OXIDE FUEL CELL AND METHOD FOR PREPARATION THEREOF

(75) Inventors: Fumio Munakata, Tokyo (JP); Kenji Furuya, Kanagawa (JP); Masaharu Hatano, Kanagawa (JP); Yoshinori Fujie, Kanagawa (JP); Manabu Suhara, Kanagawa (JP)

(73) Assignee: Seimi Chemical Co., Ltd., Chigasaki ( * ) Notice: Subject to any disclaimer, the term of this patent is extended or adjusted under 35 U.S.C. 154(b) by 326 days.

(21) Appl. No.: 10/494,372

(22) PCT Filed: Nov. 15, 2002

(86) PCT No.: PCT/JP02/11949

§ 371 (c)(1),
(2), (4) Date: Sep. 28, 2004

(87) PCT Pub. No.: WO03/043111

PCT Pub. Date: May 22, 2003

(65) Prior Publication Data

US 2005/0031518 A1    Feb. 10, 2005

(30) Foreign Application Priority Data

Nov. 15, 2001    (JP)    ............... 2001-350372

(51) Int. Cl.
*C01B 13/00*    (2006.01)
*C01B 11/00*    (2006.01)
*H01M 6/18*    (2006.01)
*H01M 4/48*    (2006.01)

(52) U.S. Cl. ............... 423/263; 423/593.1; 423/594.1; 423/594.2; 423/594.3; 423/594.4; 423/594.5; 423/594.6; 423/599; 423/600; 429/218.1; 429/221; 429/223; 429/224; 429/231.6; 429/304; 429/319

(58) Field of Classification Search ................ 423/263, 423/594.1–6, 599, 600; 429/30, 33, 231.6, 429/304, 319, 218.1, 221, 223, 224
See application file for complete search history.

(56) References Cited

U.S. PATENT DOCUMENTS 6,090,500 A    7/2000    Ishihara et al.

FOREIGN PATENT DOCUMENTS

| JP | 11-335164 | 12/1999 |
|----|-----------|---------|
| JP | 2000-44340 | 2/2000 |
| JP | 2000-113898 | 4/2000 |
| JP | 2003-7309 | 1/2003 |
| WO | 95/05685 | 2/1995 |
| WO | 98/22392 | 5/1998 |

*Primary Examiner*—Wayne A. Langel
*Assistant Examiner*—James Fiorito
(74) *Attorney, Agent, or Firm*—Oblon, Spivak, McClelland, Maier & Neustadt, P.C.

(57) ABSTRACT

The present invention provides a composite oxide for a high performance solid oxide fuel cell which can be fired at a relatively low temperature, and which has little heterogeneous phases of impurities other than the desired composition. The composite oxide is the one having a perovskite type crystal structure containing rare earth elements, and having constituent elements homogeneously dispersed therein. A homogeneous composite oxide having an abundance ratio of heterogeneous phases of at most 0.3% by average area ratio, and a melting point of at least 1470° C., is obtained by using metal carbonates, oxides or hydroxides, and reacting them with citric acid in an aqueous system.

4 Claims, 6 Drawing Sheets

COMPOSITE OXIDE FOR SOLID OXIDE FUEL CELL AND METHOD FOR PREPARATION THEREOF

TECHNICAL FIELD

The present invention relates to a composite oxide to be used as an electrolyte or a cathode of a fuel cell employing a solid electrolyte, and a process for its production. More particularly, the present invention relates to a composite oxide for a solid oxide fuel cell, having oxygen ionic conductivity and constituting a perovskite structure, and an industrially suitable process for its production.

BACKGROUND ART

At present, development of a solid oxide fuel cell (SOFC) is in progress. As an electrolyte for this fuel cell, stabilized zirconia is commonly used. However, the stabilized zirconia has low ionic conductivity at a lower temperature, whereby it is used at a higher temperature of at least 1000° C. Therefore, expensive ceramics had to be used instead of metals as components of the fuel cell.

In order to solve this problem, in recent years, perovskite type electrolytes of $LaGaO_3$ which can be used at a lower temperature as compared with stabilized zirconia, were developed. Among them, it is reported that $LaSrGaMgO_3$ shows a good-performance (KHuang, R. S. Tichy, and J. B. Goodenough, J. Am. Ceram. Soc., 81,2565(1998), U.S. Pat. No. 6,004,688, JP-A-11-335164 and JP-A-11-665165).

However, in the preparation of this $LaGaO_3$ type compound, Ga as a typical element is not likely to constitute a perovskite structure. Therefore, firing at a high temperature is required, and there is a problem that heterogeneous phases of impurities other than the desired composition are likely to remain. As the heterogeneous phases of impurities, $LaSrGaO_4$ having a melting point of about 1400° C. which is lower than that of perovskite and having low oxygen ionic conductivity, and $LaSrGa_3O_7$ having a melting point of at least 1600° C. and having low oxygen ionic conductivity, are typical ones.

In a solid state reaction method, oxides, carbonates or hydroxides of the respective metals are mixed, as they are, with starting materials by pulverizing, followed by firing. Therefore, microscopic unevenness in the mixed state tends to occur, whereby heterogeneous phases of impurities tend to remain. In order to prepare perovskite having little heterogeneous phases of impurities, firing at a high temperature of at least 1500° C. has been required.

On the other hand, in a case where the prepared solid composite oxide powder is to be molded into an electrolyte or an electrode for a fuel cell, usually, the solid composite oxide powder is press-molded, and then sintered by heating to a temperature of from 1300° C. to 1600° C. to obtain a sintered body structure.

Accordingly, when the oxide powder prepared by means of the solid state reaction method, is press-molded and sintered, the heterogeneous phases of impurities contained in the oxide powder are fused, and pores of the sintered body are covered with the heterogeneous phases of impurities having low oxygen ionic conductivity, whereby it has been difficult to form a homogeneous electrolyte body.

As described above, according to the solid state reaction method which has been used as a common preparation method, the temperature becomes high during firing in a state where the desired composition, an intermediate and a starting material are mixed, whereby there may be a case where a part of the mixture is fused to remain in the final product as heterogeneous phases of impurities.

As a common process for a production to constitute a composition at a lower temperature, a method using nitrates or acetates is known. However, in this method, a large amount of a harmful gas such as nitric acid gas, nitrogen oxide or acetic acid will be generated during the firing, and it is not suitable for the industrial production. Further, a sol-gel process using an organic solvent such as ethylene glycol as a solvent is also known, but a gel state substance is likely to deposit on a wall of a container and will burn intensely, and therefore this is not suitable for the industrial production either.

As a preparation method for other metal composite oxides, a citric acid method for an yttrium-alkaline earth metal-transition metal composite oxide, a bismuth-alkaline earth metal-transition metal composite oxide, a lanthanum-strontium-cobalt composite oxide or a lanthanum-cobalt-iron composite oxide, is disclosed in e.g. JP-B-7-96443, JP-3081212, JP-A-9-086928 or JP-A-08-130018, as proposed by the present inventors. However, each obtained oxide has low electrical conductivity in a low temperature range of from 600° C. to 800° C., and it is not suitable for a material for a solid oxide fuel cell of lower temperature operation type.

A solid oxide ceramics for a fuel cell is required to be a solid oxide of lower temperature operation type having particularly little heterogeneous phases of impurities. Therefore, the object of the present invention is to provide a composite oxide for a high performance solid oxide fuel cell of lower temperature operation type, which can be fired at a relatively low temperature, and which has little heterogeneous phases of impurities other than the desired composition, and an industrially advantageous process for its production.

DISCLOSURE OF THE INVENTION

The present inventors have found that the desired perovskite type composition (composite oxide) can be produced at a low temperature where an intermediate or a starting material will not be fused, by reacting a specific starting material compound by means of a citric acid method under a specific condition, and as a finally obtainable composition, it is possible to produce a composition which has little heterogeneous phases different from a perovskite phase, and which is close to a single phase having constituent elements homogeneously dispersed therein. By using this composite oxide, the performance of a lower temperature operation type solid fuel cell electrolyte can be improved.

Namely, the present invention is essentially directed to the following.

A composite oxide for a solid oxide fuel cell having a perovskite type crystal structure represented by the following formula:

$$Ln_{1-x}A_xGa_{1-Y-Z}B_YC_ZO_{3-\delta} \qquad (1)$$

(provided that in the formula (1), Ln is at least one element selected from the group consisting of lanthanium, cerium, praseodymium, neodymium, samarium, gadolinium and dysprosium, A is at least one element selected from the group consisting of strontium, calcium and barium, B is at least one element selected from the group consisting of magnesium, aluminum and indium, and C is at least one element selected from the group consisting of iron, cobalt, nickel and manganese, $0.05 \leq x \leq 0.4$, $0.02 \leq y \leq 0.4$, $0.1 \leq y+$ $z \leq 0.45$ and $0 \leq \delta \leq 1$), characterized in that the abundance ratio of heterogeneous phases, which are different from the phase having a perovskite structure, is at most 0.3% by average area ratio.

Further, the present invention provides a process for producing a composite oxide for a solid oxide fuel cell having a perovskite type crystal structure represented by the above formula (1), characterized in that starting materials for metal elements constituting the composite oxide are metal compounds of any of hydroxides, oxides or carbonates, and a composite citrate which is a reaction product obtained by reacting the metal compounds and citric acid, is subjected to thermal decomposition.

BEST MODE FOR CARRYING OUT THE INVENTION

In the formula (1) which represents the composite oxide of the present invention, the conditions of $0.05 \leq x \leq 0.40$, $0.02 \leq y \leq 0.40$ and $0.10 \leq y+z \leq 0.45$ are required to constitute a perovskite structure. $\delta$ satisfies $0 \leq \delta \leq 1$. If $\delta$ is out of this range, the perovskite structure tends to be unstable such being not desirable. Among them, $0.10 \leq x \leq 0.25$, $0.05 \leq y \leq 0.25$ and $0.15 \leq y+z \leq 0.40$ are particularly preferred, whereby the perovskite structure can more readily be formed, and the oxygen ionic conductivity can be made high.

Further, in the formula (1), it is especially preferred that Ln (lanthanoid type rare earth metal) is La, A (alkaline earth metal) is Sr, and B (non-transition metal) is Mg, whereby the electrical conductivity at a low temperature can be made high. In addition, it is preferred that C (transition metal) is Co, whereby the electrical conductivity at a lower temperature can be made higher.

In a case where the composite oxide of the present invention is to be produced, citric acid is added to a starting material slurry, having carbonates, oxides or hydroxides of metal elements contained in the composite oxide, mixed in water, in an amount of from 25 to 100%, preferably from 60 to 100%, of the chemical equivalent of citric acid which is required to have all the metal ions citrated, followed by reacting the mixture at a temperature of preferably from 25° C. to 100° C., particularly preferably from 50° C. to 70° C. Here, if e.g. nitrates, chlorides or sulfates, are used as the metal compounds, a harmful by-product gas will be generated during the preparation of the composite citrate or during its thermal decomposition, or it will be difficult to carry out the thermal decomposition, such being not desirable.

In the present invention, it is particularly preferred to use hydroxides for lanthanoid type rare earth element starting materials of Ln to obtain a uniform composite citrate, wherein the constituent elements are homogeneously dispersed. Further, as gallium, in order to reduce heterogeneous phases, it is particularly preferred to employ gallium hydroxide. Also, with respect to alkaline earth metals of constituent component A, it is preferred to use carbonates to reduce the heterogeneous phases. According to a combination of these specific compounds, a remarkably uniform composite citrate can be prepared. As a result, the homogeneity of perovskite after firing is improved.

After the above reaction with citric acid, drying and dehydration are carried out, and then thermal decomposition and calcination are carried out. In this case, it is also possible to carry out the thermal decomposition and the calcination in one step of firing. However, if the thermal decomposition and the calcination are carried out at the same time, it is difficult to take uniform heating of the reaction system. Therefore, it is preferred to separately carry out the thermal decomposition and the calcination in two steps.

Then, the produced composite citrate is subjected to a thermal decomposition preferably at a temperature of from 350° C. to 500° C., and then calcined preferably at a temperature of from 900° C. to 1470° C. This aspect is one of the characteristics of the present invention. The calcination may be carried out as it is in a powder form, or firing may be carried out after molding it by a press or the like. If the calcination temperature is less than 900° C., sintering tends to be insufficient, whereby a dense powder can not be obtained, such being undesirable. On the other hand, if the calcination temperature exceeds 1470° C., the furnace body material tends to deteriorate, and the heat consumption increases, such being undesirable.

The calcination temperature is more preferably from 1200° C. to 1450° C., and particularly preferably from 1300° C. to 1420° C. The atmosphere for the thermal decomposition and the calcination may be either an oxidizing atmosphere such as air or an inert atmosphere. Pulverization may be carried out after the thermal decomposition. Further, the product after the calcination may be pulverized by e.g. a jet mill or a ball mill. There is no particular limitation to the method of the pulverization.

According to the present invention, a composite oxide can be obtained, wherein the abundance ratio of heterogeneous phases, which are different from the phase having a perovskite structure in the sintered body constitution, is at most 0.3% by average area ratio. If the abundance ratio of heterogeneous phases exceeds 0.3% by average area ratio, the melting point decreases, the toughness of the sintered body decreases, and further the electrical conductivity decreases, such being undesirable. Particularly preferably, the abundance ratio of the heterogeneous phases is at most 0.15%, and more preferably at most 0.1% by an average area ratio.

The heterogeneous phases structure in the perovskite composite oxide can be detected by the x-ray diffraction spectrum when the fraction of the heterogeneous phases is high, but when the fraction of the heterogeneous phases is low, the heterogeneous phases structure can be quantified by a reflection electronic image by a scanning electron microscope. In the present invention, the quantitative determination of the heterogeneous phases in the perovskite composite oxide is carried out by an image analysis about the reflection electronic image.

The composite oxide obtained in the present invention has little heterogeneous phases of impurities such as $LaSrGaO_4$, and constitutes a single crystal structure, and thus, it has a characteristic that the melting point is preferably at least 1470° C., particularly preferably at least 1500° C. If the melting point is less than 1470° C., the composite oxide tends to fuse during molding, such being undesirable.

Further, the composite oxide according to the present invention has an advantage that a molded body having high toughness can be easily obtained as compared with the composite oxide prepared by the conventional solid phase reaction method. Furthermore, it has a characteristic that fines will scarcely be formed at the time of pulverization of a calcined powder as compound with the composite oxide prepared by the conventional solid phase reaction method. Accordingly, the tap density of the powder after the pulverization can be made high, whereby a dense molded body can be easily obtained. Thus, the tap density of the composite oxide according to the present invention is preferably at least 1.0 $g/cm^3$. If the tap density is less than 1.0 $g/cm^3$, it tends to be difficult to obtain a dense and high strength molded body, such being undesirable. Especially, in the present invention, one having a tap density of at least 1.2 $g/cm^3$ can be obtained.

Further, the composite oxide according to the present invention has a weight-average particle diameter of preferably from 0.4 to 2 μm. If the weight-average particle diameter is less than 0.4 μm, it tends to be difficult to obtain a dense electrode molded body, such being undesirable. On the other hand, if the weight-average particle diameter is more than 2.0 μm, the strength of the molded body decreases, such being undesirable. A particularly preferred range of the weight-average particle diameter is from 0.8 to 1.3 μm.

Now, specific Examples 1 to 4 of the present invention and its Comparative Examples 1 and 2 will be described.

In each Example, identification of the crystal structure was carried out by X-ray diffraction (Cu—Kα ray, manufactured by Rigaku Corporation). Further, the melting point was obtained by a TG-DTA analysis (manufactured by Seiko Corporation) by raising the temperature at a rate of 10° C./min. The particle size distribution was measured by a laser diffraction type analysis (manufactured by Microtrac Inc.), and the weight-average particle diameter was calculated. The tap density was obtained by a powder tester (manufactured by Hosokawa Micron Corporation) in accordance with JIS R9301-2-3.

Further, in each of Examples, as for the abundance ratio of the heterogeneous phases which are different from a phase having perovskite structure in the sintering body constitution, the composite oxide powder was molded at a pressure of 2 ton/$cm^2$ by a hydrostatic press, followed by sintering at 1450° C. for 6 hours to obtain a solid electrolyte sintered body. Then, an image of the same sintered body was obtained with a magnifying power of 2000 by scanning electron microscope. Using a high-speed image processor (VIDAS Plus, manufactured by Carl Zeiss Corporation), sampling was made from five visual fields (area: 2902 $μm^2$) per sample, by means of a high-speed image processing software (KS400, manufactured by Carl Zeiss Corporation), and an average value was calculated to obtain an average area ratio of the heterogeneous phases.

EXAMPLE 1

As starting material powders, lanthanum hydroxide, strontium carbonate, gallium hydroxide and magnesium carbonate, were mixed to be $La_{0.87}Sr_{0.13}Ga_{0.8}Mg_{0.2}O_{3-\delta}$, and dispersed in water. The temperature was raised to 70° C., and citric acid was added in an amount required to have all metal ions converted to citrates, and then reacted.

Figure 1A:
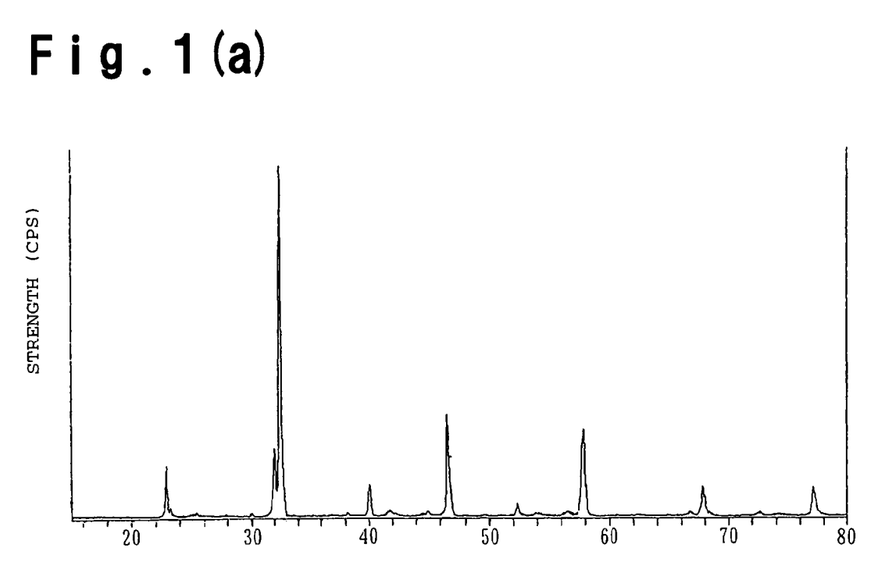
FIG. 1(a): X-ray analysis pattern of the composite oxide of Example 1 according to the present invention.

After the reaction, the product was dried at 120° C. and pulverized. Then, pre-firing was carried out at 400° C. for six hours, followed by thermal decomposition. After that, further pulverization and mixing were carried out, followed by firing at 1450° C. for 12 hours. The form after the firing was a white powder. After the firing, it was pulverized by a ball mill for six hours. The weight-average particle diameter of the obtained composite oxide powder was 0.56 μm, and the tap density was 1.27 $g/cm^3$. The result of the crystal structure analysis is shown in FIG. 1($a$), and further, the state after the firing, the melting point and the identification result of the X-ray diffraction are shown in Table 1.

Figure 1B:
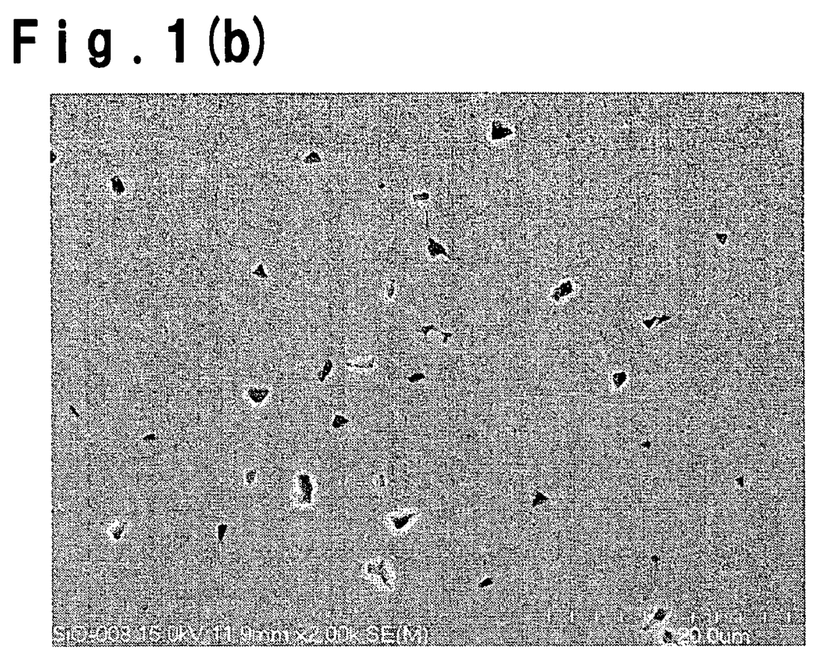
FIG. 1(b): Scanning electron microscope image (magnifying power of 2000) of the sintered body of the same Example 1.
Figure 1C:
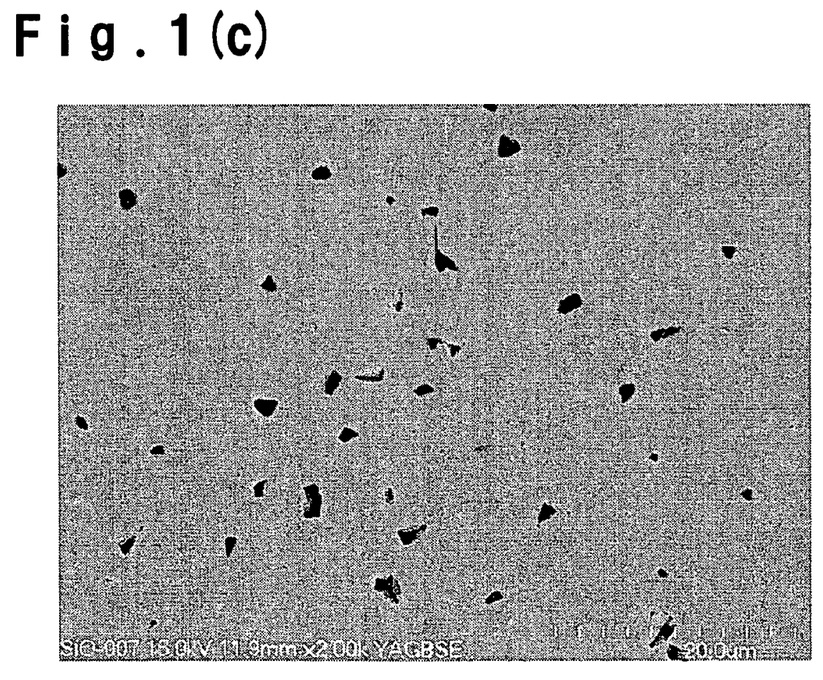
FIG. 1(c): An image obtained by cutting out about 8.8 $\mu m^2$ from a portion having no void in FIG. 1(b), followed by enlargement, and then by binarization by image processing.

A sintered body was prepared from this powder, and the image observed by a scanning electron microscope with a magnifying power of 2000 is shown in FIG. 1($b$). From a portion having no voids (black holes) in the image of this FIG. 1($b$), about 8.8 $μm^2$ was cut out, followed by enlargement and then by binarization by image processing to obtain an image, which is shown in FIG. 1($c$). Only a white part was measured based on this FIG. 1($c$).

By this image analysis, with respect to the heterogeneous phases composed of fine particles which exist in a continuous phase of perovskite, the area ratios of the heterogeneous phases were obtained in five visual fields from the number of particles per unit area and the mean particle size and found to be 0.292%, 0.172%, 0.141%, 0.065% and 0.082%, and the average area ratio of the heterogeneous phases was 0.150%.

EXAMPLE 2

As starting material powders, lanthanum hydroxide, strontium carbonate, gallium hydroxide and magnesium carbonate, were mixed to be $La_{0.87}Sr_{0.13}Ga_{0.8}Mg_{0.2}O_{3-\delta}$, and dispersed in water. The temperature was raised to 70° C., and citric acid was added in an amount required to have all metal ions converted to citrates, and then reacted.

Figure 2:
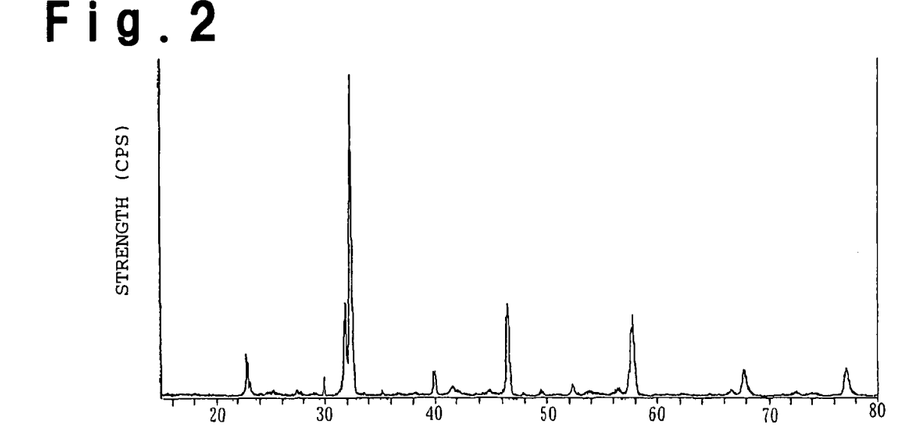
FIG. 2: X-ray analysis pattern of Example 2 according to the present invention.

After the reaction, the product was dried at 120° C. and pulverized. Then, pre-firing was carried out at 400° C. for six hours, followed by thermal decomposition. After that, further pulverization and mixing were carried out, followed by firing at 1350° C. for 12 hours. The form after the firing was a white powder. After the firing, it was pulverized by a ball mill for six hours. The weight-average particle diameter of the obtained composite oxide powder was 0.49 μm, and the tap density was 1.21 $g/cm^3$. The result of the crystal structure analysis is shown in FIG. 2, and further, the state after the firing, the melting point and the identification result of the X-ray diffraction are shown in Table 1. The average area ratio of the heterogeneous phases of the sintered body calculated in the same manner as in Example 1 was 0.159%.

EXAMPLE 3

As starting material powders, lanthanum hydroxide, strontium carbonate, gallium hydroxide, magnesium carbonate and cobalt carbonate were mixed to be $La_{0.8}Sr_{0.2}Ga_{0.6}Mg_{0.2}Co_{0.2}O_{3-\delta}$, and dispersed in water. The temperature was raised to 70° C., and citric acid was added in an amount required to have all metal ions converted to citrates, and then reacted.

Figure 3:
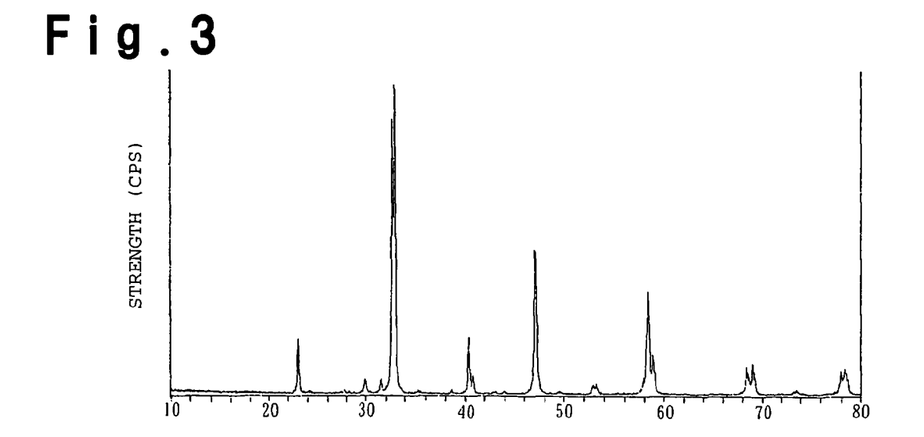
FIG. 3: X-ray analysis pattern of Example 3 according to the present invention.

After the reaction, the product was dried at 120° C. and pulverized. Then, pre-firing was carried out at 400° C. for six hours, followed by thermal decomposition. After that, further pulverization and mixing were carried out, followed by firing at 1450° C. for 12 hours. The form after the firing was a black powder. After the firing, it was pulverized by a ball mill for six hours. The weight-average particle diameter of the obtained composite oxide powder was 0.86 µm, and the tap density was 1.34 g/cm³. The result of the crystal structure analysis is shown in FIG. 3, and further, the state after the firing, the melting point and the identification result of the X-ray diffraction are shown in Table 1. The average area ratio of the heterogeneous phases of the sintered body calculated in the same manner as in Example 1 was 0.107%.

EXAMPLE 4

As starting material powders, lanthanum hydroxide, strontium carbonate, gallium hydroxide and magnesium carbonate, were mixed to be $La_{0.87}Sr_{0.13}Ga_{0.8}Mg_{0.2}O_{3-\delta}$, and dispersed in water. The temperature was raised to 70° C., and citric acid was added in an amount corresponding to 70% of the amount required to have all metal ions converted to citrates, and then reacted.

Figure 4:
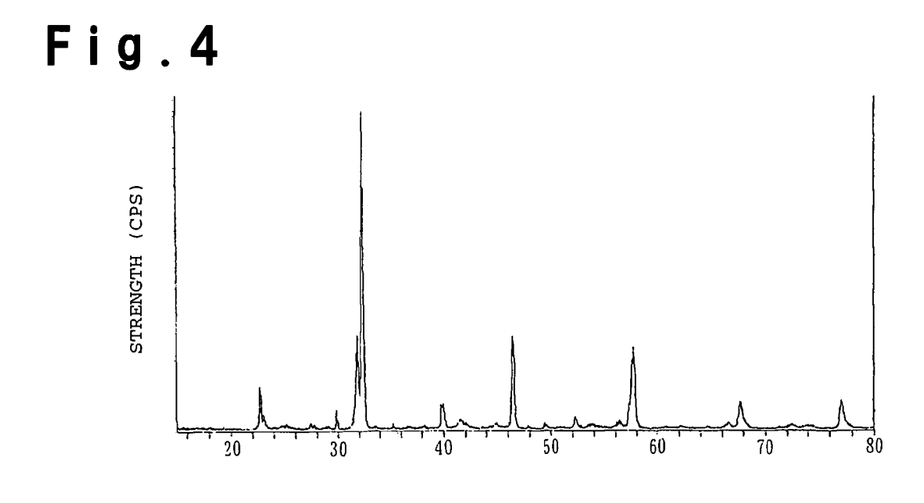
FIG. 4: X-ray analysis pattern of Example 4 according to the present invention.

After the reaction, the product was dried at 120° C. and pulverized. Then, pre-firing was carried out at 400° C. for six hours, followed by thermal decomposition. After that, further pulverization and mixing were carried out, followed by firing at 1350° C. for 12 hours. The form after the firing was a white powder. After the firing, it was pulverized by a ball mill for six hours. The weight-average particle diameter of the obtained composite oxide powder was 0.66 µm, and the tap density was 1.22 g/cm³. The result of the crystal structure analysis is shown in FIG. 4, and further, the state after the firing, the melting point and the identification result of the X-ray diffraction are shown in Table 1. The average area ratio of the heterogeneous phases of the sintered body calculated in the same manner as in Example 1 was 0.168%.

COMPARATIVE EXAMPLE 1

As starting material powders, lanthanum oxide, strontium carbonate, gallium oxide and magnesium carbonate, were mixed to be $La_{0.87}Sr_{0.13}Ga_{0.8}Mg_{0.2}O_{3-\delta}$, and pulverized and mixed by a ball mill. The mixture was pre-fired at 400° C. for six hours, followed by thermal decomposition. After that, further pulverization and mixing were carried out, followed by firing at 1450° C. for 12 hours.

Figure 5A:
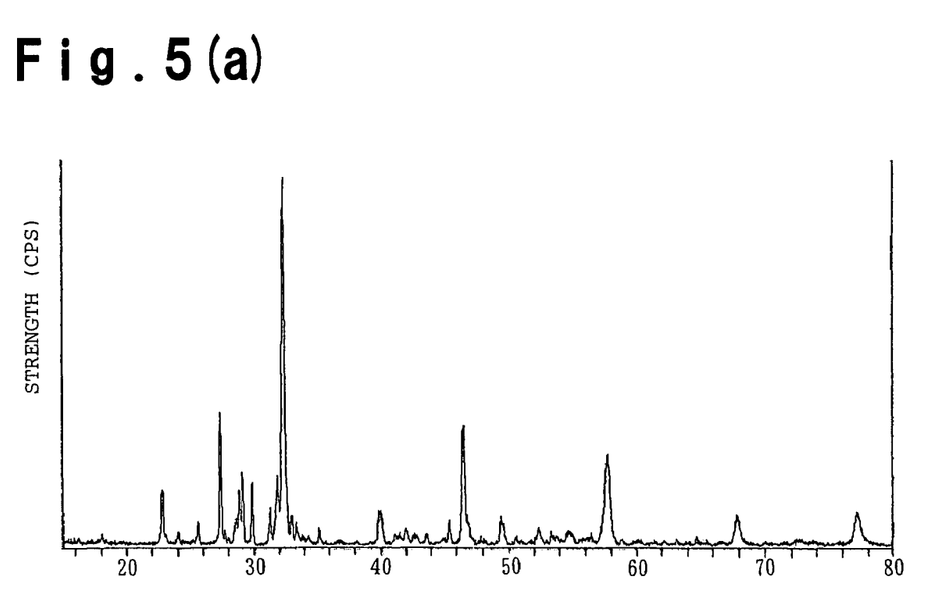
FIG. 5(a): X-ray analysis pattern of Comparative Example 1 according to a conventional method.

The form after the firing was a brown block. After the firing, it was pulverized by the ball mill for six hours. The weight-average particle diameter of the obtained composite oxide powder was 2.21 µm, and the tap density was 0.98 g/cm³. The result of the crystal structure analysis is shown in FIG. 5(*a*), and the state after the firing, the melting point and the identification result of the X-ray diffraction are shown in Table 1.

Figure 5B:
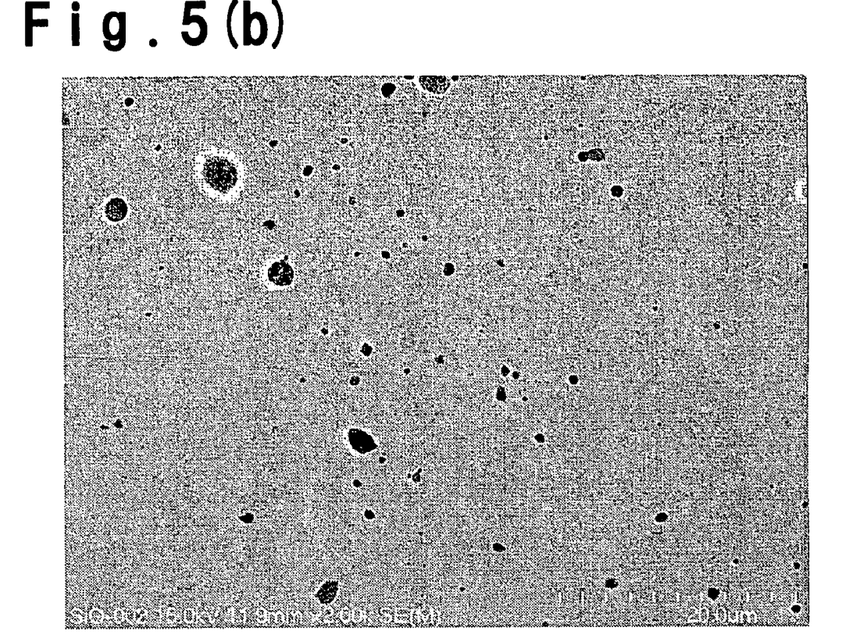
FIG. 5(b): Scanning electron microscope image (magnifying power of 2000) of the sintered body of Comparative Example 1.
Figure 5C:
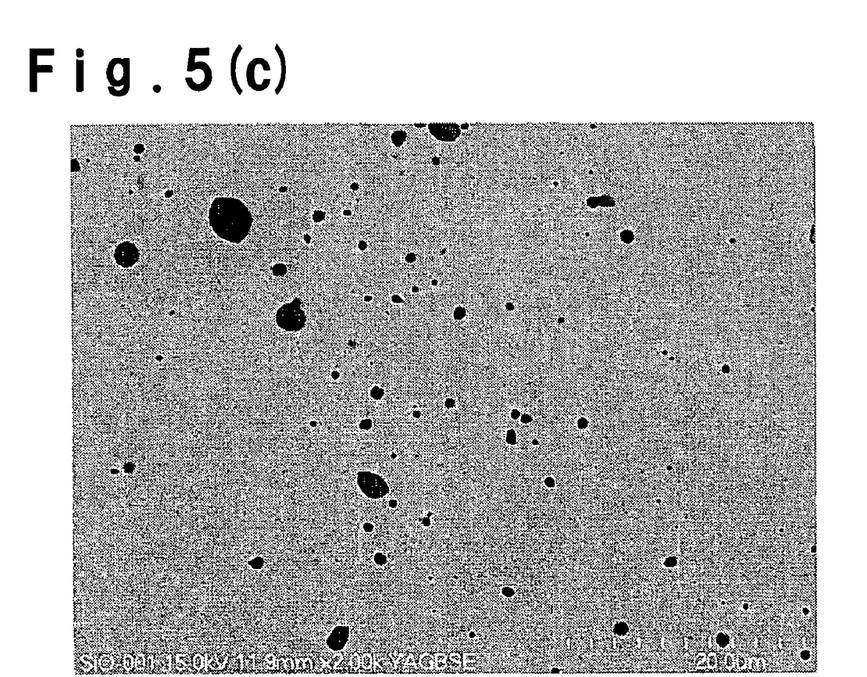
FIG. 5(c): An image obtained by cutting out about 22 $\mu m^2$ from a portion having no void in FIG. 5(b), followed by enlargement, and then by binarization by image processing.

Further, the image observed by a scanning electron microscope with a magnifying power of 2000 in the same manner as in Example 1, is shown in FIG. 5(*b*). From a portion having no voids (black holes) in the image of the FIG. 5(*b*), about 22 µm² was cut out, followed by enlargement, and then by binarization by image processing to obtain an image, which is shown in FIG. 5(*c*). Only a white part was measured based on this FIG. 5(*c*).

By this image analysis, the area ratios of the heterogeneous phases were obtained in five visual fields in the same manner as in Example 1 and found to be 0.770%, 0.406%, 0.547%, 1.234% and 0.596%, and the average area ratio of the heterogeneous phases was 0.711%.

COMPARATIVE EXAMPLE 2

As starting material powders, lanthanum oxide, strontium carbonate, gallium oxide, magnesium carbonate and cobalt oxide, were mixed to be $La_{0.8}Sr_{0.2}Ga_{0.6}Mg_{0.2}Co_{0.2}O_{3-\delta}$, and pulverized and mixed by a ball mill. The mixture was pre-fired at 400° C. for six hours, followed by thermal decomposition. After that, further pulverization and mixing were carried out, followed by firing at 1450° C. for 12 hours.

Figure 6:
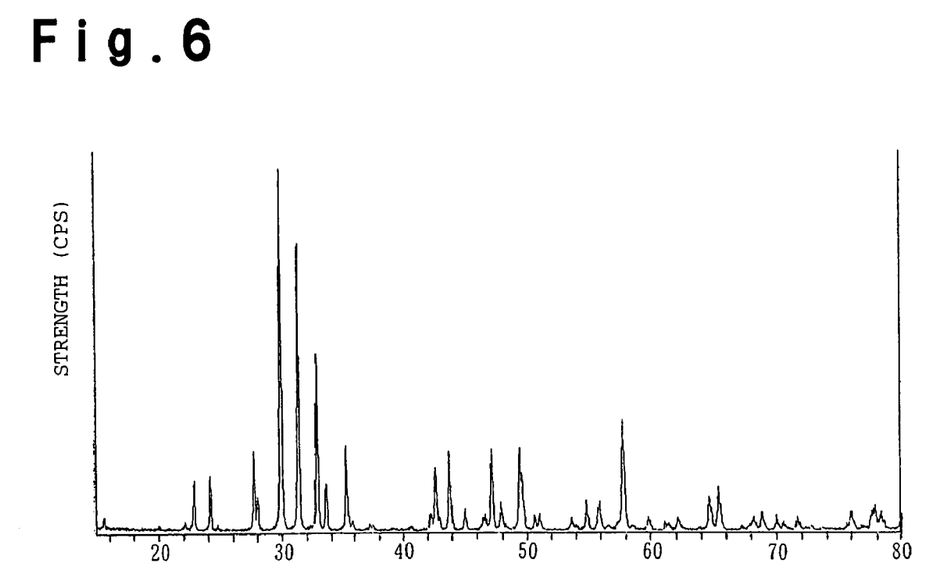
FIG. 6: X-ray analysis pattern of Comparative Example 2 according to the conventional method.

The form after the firing was a black block. After the firing, it was pulverized by the ball mill for six hours. The weight-average particle diameter of the 1o obtained composite oxide powder was 2.11 µm, and the tap density was 0.92 g/cm³. The result of the crystal structure analysis is shown in FIG. 6, and further, the state after the firing, the melting point and the identification result of the X-ray diffraction are shown in Table 1. A perovskite phase was not identified.

TABLE 1

|  | State after firing | Melting point (° C.) | Identification result of the X-ray diffraction |
|---|---|---|---|
| Ex. 1 | White powder | At least 1500° C. | Perovskite structure Single phase |
| Ex. 2 | White powder | At least 1500° C. | Perovskite structure Single phase |
| Ex. 3 | Black powder | At least 1500° C. | Perovskite structure Single phase |
| Ex. 4 | White powder | At least 1500° C. | Perovskite structure Single phase |
| Comp. Ex. 1 | Brown block | 1375° C. | Perovskite structure Containing impurity phase |
| Comp. Ex. 2 | Black block | 1420° C. | Unknown structure |

INDUSTRIAL APPLICABILITY

According to the present invention, it is possible to provide an extremely uniform composite oxide for a high performance solid oxide fuel cell of low temperature operation type, which can be fired at a relatively low temperature and which has little heterogeneous phases of impurities other than the desired composition. Further, it is possible to provide a process whereby the composite oxide can be industrially advantageously produced in large quantities without generation of a harmful gas at the time of firing, as compared with the conventional process.

The invention claimed is:

1. A composite oxide for a solid oxide fuel cell having a perovskite type crystal structure represented by the following formula:

$$Ln_{1-X}A_XGa_{1-Y-Z}B_YC_ZO_{3-\delta} \quad (1)$$

wherein Ln is at least one element selected from the group consisting of lanthanium, cerium praseodymium, neodymium, samarium, gadolinium, dysprosium, and mixtures thereof, A is at least one element selected from the group consisting of strontium, calcium, barium, and mixtures thereof, B is at least one element selected from the group consisting of magnesium, aluminum, indium, and mixtures thereof, and C is at least one element selected from the group consisting of iron, cobalt, nickel, manganese, and mixtures thereof, $0.05 \leq x \leq 0.4$, $0.02 \leq y \leq 0.4$, $0.1 \leq y+z \leq 0.45$, $0 \leq \delta \leq 1$, and the heterogeneous phases, which are different from the phase having a perovskite structure, are present in an amount such that the average area ratio of heterogenous phase to the phase having perovskite structure is at most 0.3%, the weight-average particle diameter of the composite oxide is from 0.4 to 2 μm, and the tap density is at least 1.0 g/cm³.

2. The composite oxide according to claim 1, wherein the melting point of the composite oxide is at least 1470° C.

3. The composite oxide according to claim 1, wherein Ln comprises La, A comprises Sr, and B comprises Mg.

4. A process for producing a composite oxide for a solid oxide fuel cell having a perovskite type crystal structure represented by the following formula:

$$Ln_{1-X}A_XGa_{1-Y-Z}B_YC_ZO_{3-\delta} \qquad (1)$$

wherein Ln is at least one element selected from the group consisting of lanthanium, cerium praseodymium, neodymium, samarium, gadolinium, dysprosium, and mixtures thereof, A is at least one element selected from the group consisting of strontium, calcium, barium, and mixtures thereof, B is at least one element selected from the group consisting of magnesium, aluminum, indium, and mixtures thereof, and C is at least one element selected from the group consisting of iron, cobalt, nickel, manganese, and mixtures thereof, $0.05 \leq x \leq 0.4$, $0.02 \leq y \leq 0.4$, $0.1 \leq y+z \leq 0.45$ and $0 \leq \delta \leq 1$, wherein starting materials for metal elements constituting the composite oxide are metal compounds selected from the group consisting of hydroxides, oxides, carbonates, and mixtures thereof, wherein the metal compound starting material containing Ln is a hydroxide and wherein the metal compound starting material containing element A is a carbonate, comprising forming the metal compound starting materials into a slurry employing water as a medium, reacting the slurry with citric acid to produce the composite citrate, subjecting the composite citrate to thermal decomposition at a temperature of from 350° C. to 500° C., and calcining the composite citrate at a temperature of from 900° C. to 1470° C.

* * * * *